Sept. 21, 1937.   L. DEVAUX   2,093,668
CALL TRANSMITTER DEVICE
Filed Aug. 31, 1933   2 Sheets-Sheet 1
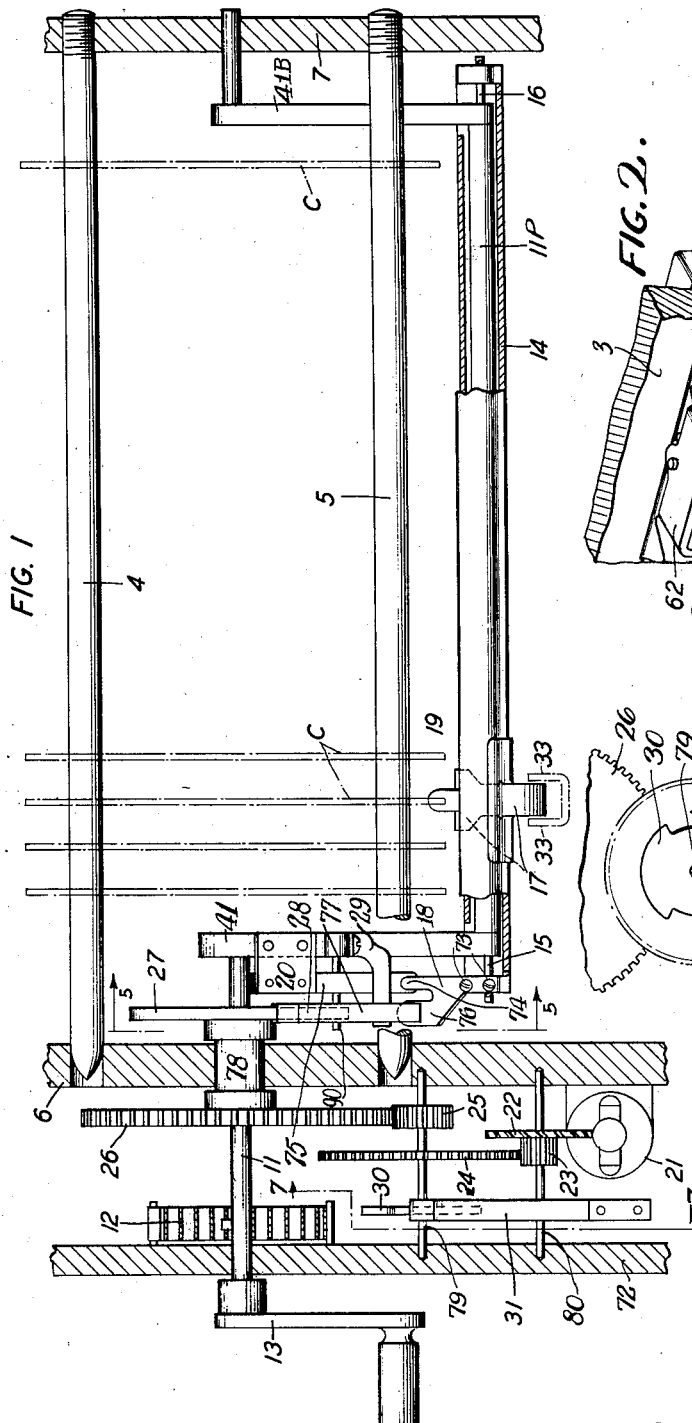
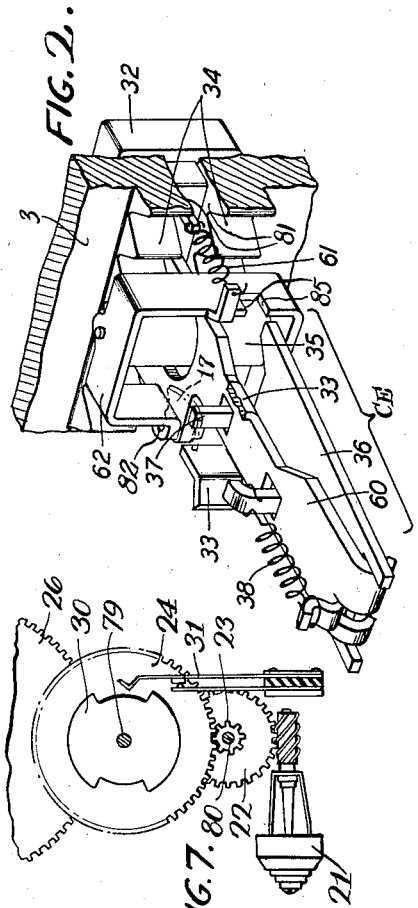
INVENTOR
L. DEVAUX
ATTORNEY Sept. 21, 1937. L. DEVAUX 2,093,668
CALL TRANSMITTER DEVICE
Filed Aug. 31, 1933 2 Sheets-Sheet 2

INVENTOR
L. DEVAUX
BY
ATTORNEY

Patented Sept. 21, 1937

2,093,668

UNITED STATES PATENT OFFICE 2,093,668

CALL TRANSMITTER DEVICE

Lucien Devaux, Paris, France, assignor to Western Electric Company, Incorporated, New York, N. Y. a corporation of New York Application August 31, 1933, Serial No. 687,555
In France December 2, 1932

5 Claims. (Cl. 177—380)

This invention relates to call transmitter devices of the type used for example in automatic and semi-automatic telephone systems for controlling the operation of so-called selector and connector switches for establishing telephone connections and the object of this invention is to improve the construction and operation of such devices.

According to this invention a call transmitter of the repertory type is provided in which a plurality of semi-circular plates having means defining groups of teeth distributed at the periphery of their curved portions and representing telephone calls to be transmitted control the operation of a pulsing mechanism by negativing the operation of such mechanism according to the character of the groups of teeth in the plates. A housing for the pulsing mechanism is provided with means for adjustably and removably securing such plates in position adjacent each other in a row, and manually operating means is provided whereby the selection of the plates is effected by a wiper slidably mounted on a crank journaled in the mounting which supports the plates. Manually operable means is provided for rotating the crank and simultaneously tensioning a motor spring for moving the wiper in position, wherein the release of the manually operable means is effective under the tension of the motor spring to actuate a gearing mechanism under control of a governor for actuating the impulse mechanism and moving the wiper in operative relation with respect to the selected plate, the operation of the wiper on the plate being effective to operate a set of contacts in a manner to negative the operation of the impulse contact according to the group of teeth at the periphery of the selected plate, and means is provided whereby the plate selecting mechanism is locked in its adjusted position during the operation of the crank and the wiper carried thereby as to prevent faulty operation of the call transmitter due to the moving of the selecting means prior to the completion of the call transmitter operation.

Other features of the invention and advantages will appear from the following description and by the claims appended thereto reference being had to the accompanying drawings in which:

Fig. 1 is an assembly view showing a number of operating parts in section.

Fig. 2 is an enlarged perspective view of the manually movable slider which constitutes a part of the selecting mechanism;

Fig. 7 is a partial view of the pulsing mechanism, a number of operating parts being shown in section taken on line 7—7 of Fig. 1.

Figure 3:
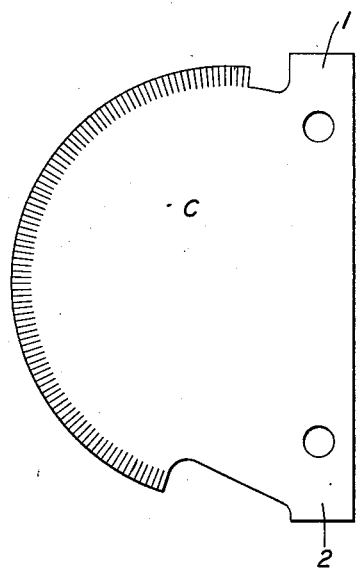
Fig. 3 shows an uncut control member.
Figure 4:
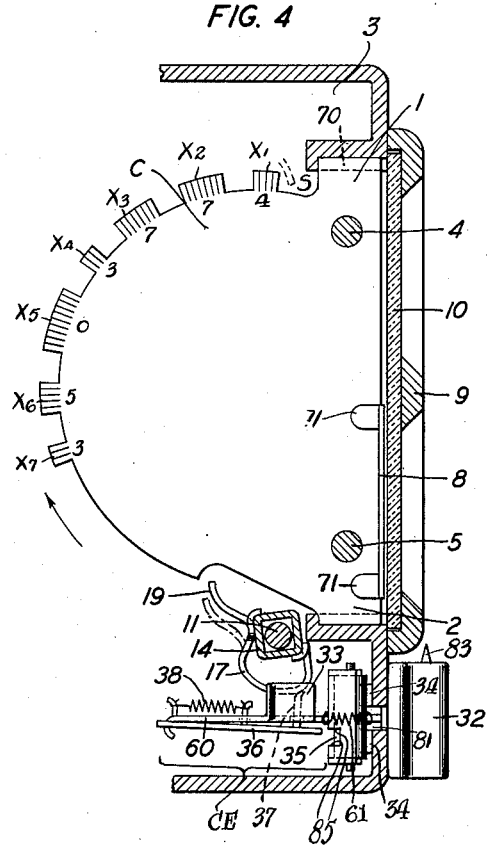
Fig. 4 is a cross-sectional view taken between two control members and shows the relative location of the selecting mechanism and a control member when the sender is in normal unoperated position.

Referring particularly to Figs. 1, 3, and 4 each control member or cam C, is a semi-circular metal stamping or plate provided with lugs 1 and 2 for positioning it in grooves such as 70 in the housing 3. The periphery of the cam C is toothed, the number of teeth being equal to the maximum number of impulses to be sent plus the number of impulses representing the interdigital periods.

For sending a seven-digit number, with six interdigital periods each corresponding to five impulses, the total number of teeth is (7×10) plus (6×5) or 100 teeth.

For registering a subscriber's number, teeth are removed to leave groups of teeth such as X1, X2, X3, X4, X5, X6, and X7 representing the different digits and these groups of teeth are separated by intervals of five teeth, representing the interdigit of spaces, the teeth in excess of the number required to form a predetermined telephone number being removed from the plate.

In Fig. 1, the positions of the different cams are shown in dotted lines or in outline. They are held in place by their lugs 1 and 2 which fit into the slots 70 of the housing 3 as shown in Fig. 4. To secure the cams or control members C firmly, two rods 4 and 5 pass through holes in the cams and are fastened to flanges 6 and 7 formed or secured to the housing 3 in any suitable manner as, for example, by screwing them into flange 7 as shown in Fig. 1. Each cam is provided with a designation plate 8 secured to it by clips 71 as shown in Fig. 4; the plates 8 may be placed in staggered positions so that their width may be made equal to twice the distance separating two cams and a cover 9 is provided with a glass window 10 to permit the reading of the designation strip or plate 8 from the outside of the housing 3.

A crank 11 is journaled on flanges 6, 7 and 72 and carries a tubular member 14 of square cross-section on which a wiper member 17 is frictionally mounted for sliding movement in selected position with respect to the row of plates C, wiper member 17 having a lug portion 19 shown in Figs. 1, 4, and 5 for engaging the groups of teeth X1, X2, X3, etc. on the plates C in a manner that will be hereinafter described in detail. Tubular member 14 is pivotally supported on the crank arms 41 and 41B by pins 15 and 16 and has cut away portions at both ends as shown in Fig. 1 for permitting this member and the wiper 17 carried thereby to turn a small angular distance concentric to crank pin 11P.

Figure 5:
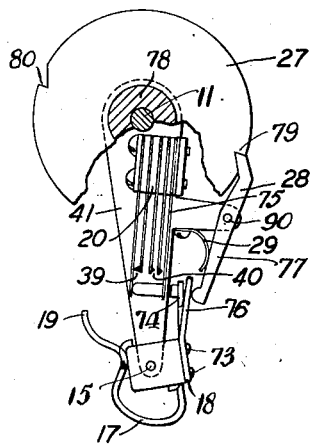
Fig. 5 is a partial cross-sectional view taken along the line 5—5 of Fig. 1 and looking in the direction of the arrows.

On one end of tubular member 14 is secured as by screws 73 an arm 18 having a lug 74 disposed in engageable relation with springs 75 of a spring pileup 20 shown in Figs. 1 and 5 and another lug 76 disposed in operable relation with the arm 77 of a pawl 28 in turn pivotally mounted on a pin 90 carried by crank arm 41, the pawl 28 being forced in engagement as the case may be with the teeth 79 and 80 of a disc 27 by a spring 29 and thereby controlling the engagement of wiper 17 with respect to the groups of teeth of plates C and the operation of contacts 39 and 40. The disc 27 is mounted at one end of a sleeve 78 rotatably mounted in flange 6 and serving as a bearing for the crank shaft 11. On the other end of sleeve 78 is mounted a gear 26 which meshes with a pinion 25 carried by a shaft 79 journaled on flanges 72 and 6 and on this shaft is securely mounted a gear 24 and an impulse cam 30 for actuating the impulse contact 31, the gear 24 engaging a pinion 23 on shaft 80 for actuating a centrifugal governor 21 through the operation of worm gear 22. A motor spring 12 which is tensioned upon the operation of the crank shaft 11 in a clockwise direction through the movement of handle lever 13 is provided for returning the crank to its normal position and for actuating the gearing mechanism under control of the governor mechanism, that is, during the pulsing operation of the call transmitter as will hereinafter be described in detail.

Figure 6:
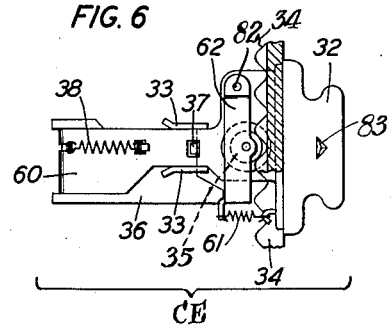
Fig. 6 is a top plan view of the slider shown in Fig. 2.

The housing 3 is provided with a slot 81 shown in Figs. 2 and 4 for slidably mounting a carriage CE consisting of a handle piece 32 secured at the front disposed end of a plate 60 and on this plate is mounted as on pivot 82 shown in Figs. 2 and 6 a square-shaped bracket 62 carrying a roller 35 engaging the parallelly disposed rack 34 under the tension of a spring 61 thereby yieldably holding the carriage CE in its selected position as indicated by a pointer 83 carried by handle member 32 and the designation plates or strips 8. To the inner disposed end of plate 60 is pivotally mounted a latching plate 36 which is normally held against the underside of plate 60 by a spring 38, and plate 60 is provided with an opening as shown in Figs. 2 and 6 through which a lug 37 carried by the locking plate 36 extends in engageable relation with the body or cam portion of wiper 17 and thereby holding the plate 36 against the resistance of spring 38 in registry with a notch 85 in the bracket 62 as to permit the movement thereof under the tension of spring 61 as effected by the passing of the roller 35 on the parallel toothed racks 34 during the selecting movement of the carriage CE in the slot 81 and the movement of wiper 17 along the oscillating bar 14 due to its engagement with the lugs 33, 33 formed with carriage plate 60.

Upon a movement of crank 11 and wiper 17 in clockwise direction, as indicated by the arrow in Fig. 4, the cam portion of this wiper releases the plate 36 which is then moved in abutment against the underside of plate 60 under the action of spring 38 wherein the free end of plate 36 engages the bracket 62 and thereby prevents the operation of the carriage during the off normal position of the wiper 17.

Upon a small angular movement of crank 11 in the direction indicated by the arrow, the pawl 28 is cammed on the periphery of the disc 27 against the resistance of its retracting spring 29 and the pivotal movement of pawl 28 is imparted to the bar 14 through the engagement of the pawl arm 77 with lug 76 of arm 18 for moving the wiper 17 in position as shown in dotted lines in Fig. 4, that is, out of engagement with the groups of teeth on the plate and causing the operation of shunting contact 39. Upon the movement of the crank and the wiper 17 in position as indicated at S in Fig. 4, however, the pawl 28 engages the tooth 80 of disc 27 and causes the closure of shunting contact 39 and the oscillating movement of bar 14 for moving the wiper 17 in position for engaging the group of teeth on the plate C simultaneously with the operation of the impulse mechanism when the crank is returned to normal position under the tension of motor spring 12.

In a typical example of operation the crank 11 and the wiper 17 carried thereby are held in normal unoperated position as shown in Figs. 1 and 4 by the initial tension of motor spring 12. In this position the body or cam portion of wiper 17 engages the lug 37 of plate 36 and holds the free end of this plate in registry with the notch 85 in bracket 62, thus permitting the pivotal movement of this bracket as generated by the passing of the roller 35 on the teeth of parallelly disposed racks 34, 34 upon the sliding movement of carriage CE in the slot 81 of housing 3 for selectively positioning the wiper 17 in registry with one of the plates C, which position is indicated by pointer 83 and the station designation strip 8 carried by such plate.

The movement of crank 11 an angular distance of substantially 180° from the position shown in Fig. 4 is effective to position the wiper 17 at the point S indicated in dotted lines in Fig. 4 and tension the motor spring 12. During the manual operation of crank 11 in the direction indicated by the arrow, it is to be noted, however, that the disc 27 remains stationary and the pawl 28 which is carried by the crank arm 41 is caused as above mentioned to move a small angular distance on its pivot 90 for imparting a small angular movement to the bar 14 through the engagement of lug 76 of arm 18 with this pawl, thus preventing the lug portion 19 of wiper 17 from engaging the group of teeth of the selected plate during the movement of the crank in that direction, that is as indicated by the arrow in Fig. 4.

Upon the return movement of the crank 11 the pawl 28 engages the tooth 80 in the disc 27 and permits the pivotal movement of bar 14 under the tension of spring 29 and that of contacts 39 and 40 for imparting a small angular movement to the bar 14 and thereby positioning the wiper 17 in engageable relation with the group of teeth X1, X2, X3, etc. upon its return movement under the tension of motor spring 12. The engagement of pawl 28 with disc 27 during the return movement of crank 11 actuates the gear 26 and the cam 30 and thereby operates the impulse contact 31 at a frequency or rate of speed determined by the centrifugal governor 21.

The engagement of wiper 17 with the first tooth of the group of teeth X1, for example, will cause a small angular movement of bar 14 and thereby cause the opening of contact springs 39 and the closing of the springs 40. The latter springs being provided as above mentioned to perform switching functions well known in the telephone art and form no part of this invention. The function of spring 39, however, being when in their closed position to negative the operations of the impulse mechanism according to the interdigit spaces formed on the plates C which are formed as above stated by the removal of a definite number of teeth following each group of teeth representing the digits to be transmitted.

The plate C, for example, as above specified is provided with seven groups of teeth, X1 representing digit 4
X2 representing digit 7
X3 representing digit 7
X4 representing digit 3
X5 representing digit 0
X6 representing digit 5 and
X7 representing digit 3 or telephone No. 4773053 with interdigit spaces equal to five teeth between each digit thus formed. Therefore, the passing of the wiper 7 on the group of teeth X1 will hold the contact 39 in its open position thereby permitting the transmitting of four pulses through the operation of the pulsing mechanism. However, upon the falling of the wiper 17 in the notch or interdigit space between the group of teeth X1 and X2, the bar 14 will be rotated under the tension of spring 39 and 40, spring 39 closing their contacts for negativing the operation of the impulse contacts 31 according to the number of teeth representing the interdigit space, and this operation is continued to the complete operation of the crank to normal position when the body or cam portion of wiper 17 reengages the lug 37 for unlatching the bracket 62 and thereby permitting the movement of the carriage CE in selected positions for a succeeding operation.

What is claimed is:

1. In a call transmitter, a mounting, a plurality of digits defining members disposed in a row on said mounting, a rotatable crank, means carried by said crank for movement adjacent said members, a carriage having means for engaging the first mentioned means for moving it with rerespect to said members selectively, a latching device for said carriage comprising a pivoted bracket, a roller carried by said bracket, a toothed rack carried by said mounting, a spring for yieldably holding said roller in engaged relation with said rack, a plate pivotally mounted on said carriage, a spring for yieldably holding said plate in engaged relation with said bracket upon the off normal condition of the first mentioned means for preventing the operation of said carriage and a lug carried by said plate and engaged by the first mentioned means for moving said plate in registry in a groove in said bracket to permit the adjusting movement of said carriage upon the return movement of the first mentioned means to normal.

2. In a call transmitter, a plurality of semicircular plates each of said plates having diametrically opposite lug portions, a mounting for said plates having grooves registering with said lug portions for adjustably supporting said plates, a cover for said mounting having a transparent panel and an inscription member carried by each of said plates and visible through said panel, said plates being removable from said mounting upon the opening of said cover.

3. In a call transmitter a semidisc-shaped plate having groups of teeth on its curved portion representing pulses, a mounting for said plate, a crank shaft journaled on said mounting for movement in two opposite directions, a wiper pivoted on the crank pin of said shaft for movement concentric to the curved portion of said plate, a mechanism for operating said wiper upon the movement of said shaft in one of said directions, said mechanism including a normally stationary disc member having two diametrically opposite ratchet teeth, a spring-pressed pawl carried by said crank, normally engaging one of the teeth of said disc and having a portion engaging said wiper for moving it out of engaged relation from said teeth upon the rotating movement of said crank in one of said directions, a set of shunting contacts operated by said wiper, said spring-pressed pawl engaging the last-mentioned tooth after a predetermined angular movement of said crank shaft for rendering said wiper effective with respect to said groups of teeth upon the movement of said crank shaft in the other direction, an impulse mechanism, a motor spring tensioned by the movement of said crank in the first-mentioned direction for causing it to turn in said other direction for actuating said mechanism and said wiper for engaging the teeth of said plate for operating said shunting contacts according to said groups of teeth for negativing a number of operations of said impulse mechanism.

4. In a call transmitter a row of semidisc-shaped plates having groups of teeth at their curved portions representing numbers, a mounting for said plates, a crank shaft supported by said mounting for movement in two opposite directions, an impulse mechanism actuated by said crank shaft in one of said directions, means pivoted on the crank pin of said shaft for movement concentric relative to the curved portions of said plates, a wiper frictionally engaging said means, means for moving said wiper in selected position with respect to said plates, a disc member having two diametrically opposite ratchet teeth, a spring-pressed pawl carried by said crank and normally engaging one of the teeth of said disc and having a portion engaging said wiper for moving it from engagement with said selected plate upon the movement of said pawl relative to said disc, means manually operable for rotating said crank in said direction, a set of shunting contacts operated upon the movement of said wiper, means for engaging said pawl with the second-mentioned tooth in said disc upon a predetermined movement of said crank shaft for rendering said wiper effective with respect to said groups of teeth upon the reverse movement of said crank shaft for operating said shunting contacts for negativing a number of operations of said impulse mechanism and a spring motor tensioned by said manually operable means for actuating said crank shaft in the other of said directions.

5. In a call transmitter, a mounting, a semi-disc-shaped plate having groups of teeth on its curved portion, a crank shaft rotatably supported by said mounting and capable of movement in two opposite directions, a wiper pivotally mounted on the crank pin of said shaft and disposed for movement with respect to the curved portion of said plate, an impulse mechanism actuated by the operation of said crank shaft in one of said directions, a mechanism for moving said wiper in position ineffective with respect to the group of teeth on said plate upon the movement of said crank shaft in said direction, said mechanism comprising a pawl carried by said crank shaft, a normally stationary disc having two toothed portions, a spring for engaging said pawl with one of said toothed portions for moving said wiper in position ineffective with the teeth on said plate upon the movement of said crank shaft in said direction, said spring engaging said pawl with the other of said toothed portions upon a predetermined angular movement of said crank shaft and thereby causing the engagement of said wiper with the group of said teeth on said plate during the movement of said crank shaft in the other direction to cause said wiper to operate said shunting contacts according to the character of said group of teeth for negativing a number of operations of said mechanism, and means for actuating said crank shaft in each of said directions.

LUCIEN DEVAUX.